United States Patent
Xie

(10) Patent No.: US 11,628,429 B2
(45) Date of Patent: Apr. 18, 2023

(54) MOLECULAR SIEVE SSZ-123, ITS SYNTHESIS AND USE

(71) Applicant: CHEVRON U.S.A. INC., San Ramon, CA (US)

(72) Inventor: Dan Xie, El Cerrito, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 122 days.

(21) Appl. No.: 17/315,431

(22) Filed: May 10, 2021

(65) Prior Publication Data

US 2022/0062877 A1    Mar. 3, 2022

Related U.S. Application Data

(60) Provisional application No. 63/071,451, filed on Aug. 28, 2020.

(51) Int. Cl.
| | |
|---|---|
| B01J 29/70 | (2006.01) |
| C01B 39/48 | (2006.01) |
| B01J 37/04 | (2006.01) |
| B01J 37/06 | (2006.01) |
| B01J 37/10 | (2006.01) |
| B01J 35/10 | (2006.01) |
| B01J 37/00 | (2006.01) |

(52) U.S. Cl.
CPC ....... B01J 29/7026 (2013.01); B01J 35/1038 (2013.01); B01J 37/009 (2013.01); B01J 37/0018 (2013.01); B01J 37/04 (2013.01); B01J 37/06 (2013.01); B01J 37/10 (2013.01); *C01B 39/48* (2013.01); *C01P 2002/72* (2013.01); *C01P 2002/80* (2013.01); *C01P 2004/03* (2013.01)

(58) Field of Classification Search
CPC .................................................... B01J 29/7026
See application file for complete search history.

(56) References Cited

U.S. PATENT DOCUMENTS

| | | | |
|---|---|---|---|
| 4,873,067 A | 10/1989 | Valyocsik et al. | |
| 7,011,810 B2 | 3/2006 | Dakka et al. | |
| 8,187,569 B2 | 5/2012 | Mertens et al. | |
| 8,853,117 B2 | 10/2014 | Mertens | |
| 9,550,684 B2 * | 1/2017 | Weston | C01B 39/48 |
| 11,033,886 B2 * | 6/2021 | Xie | B01J 37/031 |
| 2020/0061593 A1 | 2/2020 | Kamakoti et al. | |

FOREIGN PATENT DOCUMENTS

WO    2014200633 A1    12/2014

OTHER PUBLICATIONS

Zones (A Study of Piperidinium Structure-Directing Agents in the Synthesis of Silica Molecular Sieves under Fluoride-Based Conditions, J. Am. Chem. Soc. 2007, 129, 9066-9079).*

(Continued)

*Primary Examiner* — Jun Li

(57) ABSTRACT

An aluminum-rich molecular sieve material of MFS framework type, designated SSZ-123, is provided. SSZ-123 can be synthesized using 1-ethyl-1-[5-(triethylammonio)pentyl] piperidinium cations as a structure directing agent. SSZ-123 may be used in organic compound conversion and/or sorptive processes.

10 Claims, 2 Drawing Sheets

(56) References Cited

OTHER PUBLICATIONS

Li et al, Synthesis of new zeolite structures, hem. Soc. Rev., 2015, 44m 7112-7127.*
PCT International Search Report, International Appl. No. PCT/IB2021/053941, dated Aug. 13, 2021.
X. Liao, G. Chen, L. Sun, W. Huo, W. Zhang and M. Jia "Synthesis, characterization of COK-5 with different Si/Al ratios and their catalytic properties for the tert-butylation of phenol" Micropor. Mesopor. Mater. 2009, 124, 210-217.
J.L. Schlenker, J.B. Higgins, and E.W. Valyocsik "The framework topology of ZSM-57: A new synthetic zeolite" Zeolites 1990, 10, 293-296.
S-H. Lee, D-K. Lee, C-H. Shin, W.C. Paik, W.M. Lee, and S-B. Hong "Synthesis of Zeolite ZSM-57 and Its Catalytic Evaluation for the 1-Butene Skeletal Isomerization and n-Octane Cracking" J. Catal. 2000, 196, 158-166.
S-H. Lee, C-H. Shin, G.J. Choi, T-J. Park, I-S. Nam, B. Han, and S.B. Hong "Zeolite synthesis in the presence of flexible diquaternary alkylammonium ions $(C_2H_5)_3N^+(CH_2)_nN^+(C_2H_5)_3$ with n=3–10 as structure-directing agents" Micropor. Mesopor. Mater. 2003, 60, 237-249.

* cited by examiner

MOLECULAR SIEVE SSZ-123, ITS SYNTHESIS AND USE

CROSS-REFERENCE TO RELATED APPLICATIONS

This application claims priority to and the benefit of U.S. Provisional Application Ser. No. 63/071,451, filed Aug. 28, 2020.

FIELD

This disclosure relates to a novel synthetic crystalline molecular sieve of MFS framework type, designated SSZ-123, its synthesis, and its use in organic compound conversion and sorption processes.

BACKGROUND

Molecular sieves are a commercially important class of materials that have distinct crystal structures with defined pore structures that are shown by distinct X-ray diffraction (XRD) patterns and have specific chemical compositions. The crystal structure defines cavities and pores that are characteristic of the specific type of molecular sieve.

Molecular sieves are classified by the Structure Commission of the International Zeolite Association according to the rules of the IUPAC Commission on Zeolite Nomenclature. According to this classification, framework-type zeolites and other crystalline microporous molecular sieves, for which a unique structure has been established, are assigned a unique three-letter code and are described, for example, in the "Atlas of Zeolite Framework Types" by Ch. Baerlocher, L. B. McCusker and D. H. Olson (Elsevier, Sixth Revised Edition, 2007).

ZSM-57 is a molecular sieve material having a unique two-dimensional pore system consisting of intersecting 10-ring channels and 8-ring channels. The framework structure of ZSM-57 has been assigned the three-letter code MFS by the Structure Commission of the International Zeolite Association.

The composition and characterizing X-ray diffraction pattern of ZSM-57 are disclosed in U.S. Pat. No. 4,873,067 which also describes the conventional synthesis of the molecular sieve in the presence of a structure directing agent comprising the N,N,N,N',N',N'-hexaethylpentanediammonium (HEPD) cation.

S-H. Lee et al. (*J. Catal.* 2000, 196, 158-166) report that crystallization of ZSM-57 in the presence of HEPD was possible only from synthesis mixtures within very narrow compositional ranges. Synthesis mixtures with $SiO_2/Al_2O_3$ molar ratios less than 40 produced materials other than ZSM-57.

According to the present disclosure, an aluminum-rich molecular sieve of MFS framework type, designated SSZ-123, has now been synthesized using 1-ethyl-1-[5-(triethylammonio)pentyl]piperidinium cations as a structure directing agent.

SUMMARY

In a first aspect, there is provided a molecular sieve of MFS framework type having a molar ratio of $SiO_2/Al_2O_3$ in a range of from 10 to 35.

In a second aspect, there is provided an aluminosilicate molecular sieve of MFS framework type and, in its as-synthesized form, comprising 1-ethyl-1-[5-(triethylammonio)pentyl]piperidinium cations in its pores.

In a third aspect, there is provided a method of synthesizing a molecular sieve of MFS framework type, the method comprising (1) preparing a reaction mixture comprising: (a) a source of silicon; (b) a source of aluminum; (c) a source of an alkali or alkaline earth metal (M); (d) a structure directing agent comprising 1-ethyl-1-[5-(triethylammonio)pentyl]piperidinium cations (Q); (e) a source of hydroxide ions; and (f) water; and (2) subjecting the reaction mixture to crystallization conditions sufficient to form crystals of the molecular sieve.

In a fourth aspect, there is provided a process of converting a feedstock comprising an organic compound to a conversion product which comprises contacting the feedstock at organic compound conversion conditions with a catalyst comprising a molecular sieve of MFS framework type, wherein the molecular sieve has a molar ratio of $SiO_2/Al_2O_3$ in a range of from 10 to 35.

DETAILED DESCRIPTION

Definitions

Figure 1:
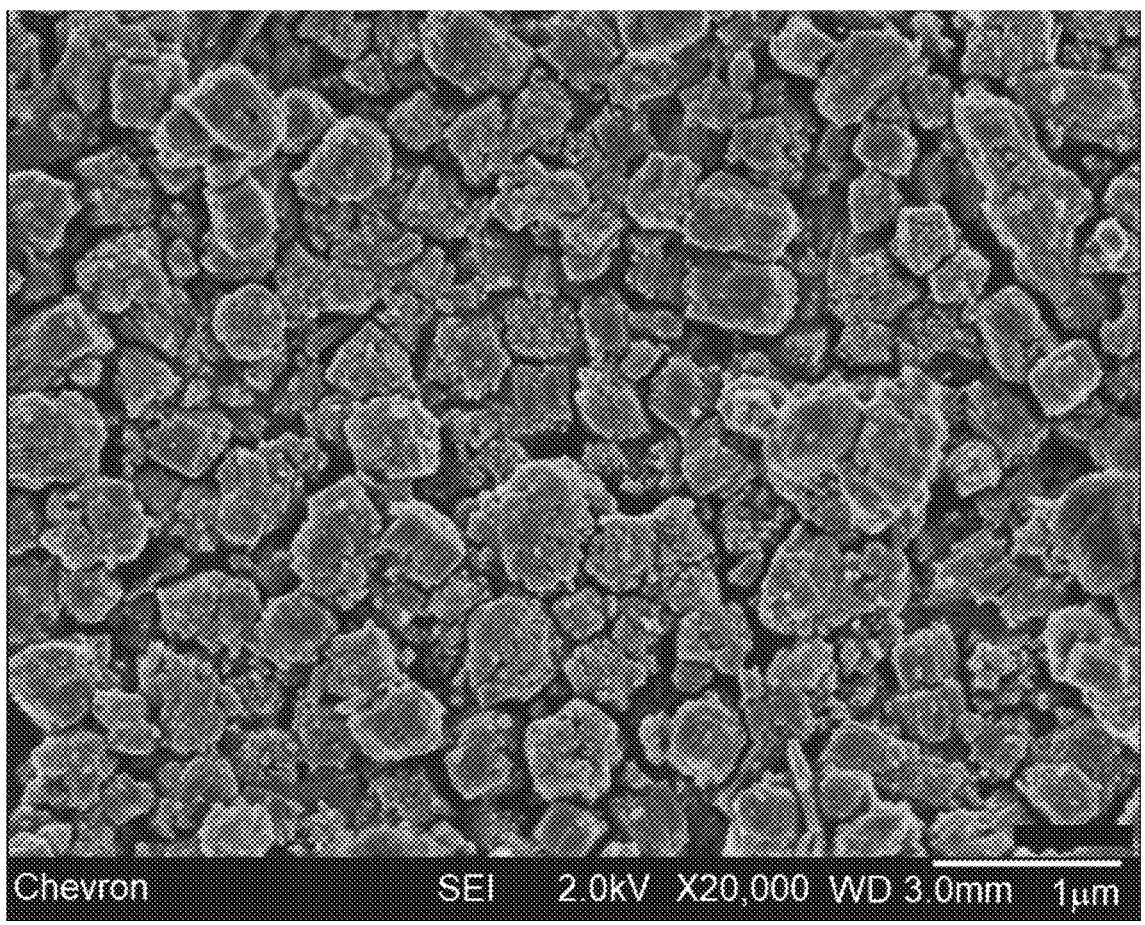
FIG. 1 shows a Scanning Electron Micrograph (SEM) image of the product of Example 1.

The term "framework type" as used herein has the meaning described in the "Atlas of Zeolite Framework Types" by Ch. Baerlocher, L. B. McCusker and D. H. Olson (Elsevier, Sixth Revised Edition, 2007).

The term "as-synthesized" is employed herein to refer to a molecular sieve in its form after crystallization, prior to removal of the structure directing agent.

The term "anhydrous" is employed herein to refer to a molecular sieve substantially devoid of both physically adsorbed and chemically adsorbed water.

Synthesis of the Molecular Sieve

Molecular sieve SSZ-123 can be synthesized by: (1) preparing a reaction mixture comprising (a) a source of silicon; (b) a source of aluminum; (c) a source of an alkali or alkaline earth metal (M); (d) a structure directing agent comprising 1-ethyl-1-[5-(triethylammonio)pentyl]piperidinium cations; (e) a source of hydroxide ions; and (f) water; and (2) subjecting the reaction mixture to crystallization conditions sufficient to form crystals of the molecular sieve.

The reaction mixture can have a composition, in terms of molar ratios, within the ranges set forth in Table 1:

TABLE 1

| Reactants | Broadest | Secondary |
|---|---|---|
| $SiO_2/Al_2O_3$ | 10 to 35 | 15 to 30 |
| $M/SiO_2$ | 0.05 to 0.50 | 0.10 to 0.50 |
| $Q/SiO_2$ | 0.01 to 0.30 | 0.05 to 0.20 |
| $OH/SiO_2$ | 0.10 to 0.70 | 0.40 to 0.60 |
| $H_2O/SiO_2$ | 15 to 60 | 20 to 40 | wherein M is an alkali or alkaline earth metal and Q comprises 1-ethyl-1-[5-(triethylammonio)pentyl]piperidinium cations.

Suitable sources of silicon include colloidal silica, precipitated silica, fumed silica, alkali metal silicates, and tetraalkyl orthosilicates (e.g., tetraethyl orthosilicate).

Suitable sources of aluminum include hydrated alumina, aluminum hydroxide, alkali metal aluminates, aluminum alkoxides, and water-soluble aluminum salts (e.g., aluminum nitrate).

The alkali or alkaline earth metal (M) is typically introduced into the reaction mixture in conjunction with the source of hydroxide ions. Examples of such metals include sodium and/or potassium, and also lithium, rubidium, cesium, magnesium, and calcium. As used herein, the phrase "alkali or alkaline earth metal" does not mean the alkali metals and alkaline earth metals are used in the alternative, but instead that one or more alkali metals can be used alone or in combination with one or more alkaline earth metals and that one or more alkaline earth metals can be used alone or in combination with one or more alkali metals.

The structure directing agent used in preparing SSZ-123 comprises 1-ethyl-1-[5-(triethylammonio)pentyl]piperidinium cations (Q), represented by the following structure (1):

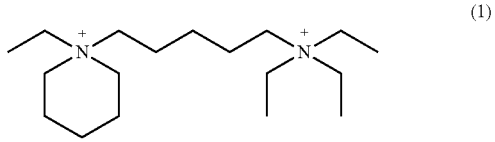

(1)

Suitable sources of Q are the hydroxides, chlorides, bromides, and/or other salts of the diquaternary ammonium compound.

The reaction mixture may contain seeds of a crystalline material, such as an MFS framework type molecular sieve from a previous synthesis, desirably in an amount of from 0.01 to 10,000 ppm (e.g., 100 to 5000 ppm) by weight of the reaction mixture. Seeding can be advantageous to improve selectivity for SSZ-123 and/or to shorten the crystallization process.

It is noted that the reaction mixture components can be supplied by more than one source. Also, two or more reaction components can be provided by one source. The reaction mixture can be prepared either batchwise or continuously.

Crystallization and Post-Synthesis Treatment

Crystallization of the molecular sieve from the above reaction mixture can be carried out under either static, tumbled or stirred conditions in a suitable reactor vessel, such as polypropylene jars or Teflon-lined or stainless-steel autoclaves, at a temperature of from 120° C. to 200° C. (e.g., 140° C. to 180° C.) for a time sufficient for crystallization to occur at the temperature used (e.g., 1 day to 21 days, or 3 days to 14 days). Crystallization is usually conducted in an autoclave so that the reaction mixture is subject to autogenous pressure.

Once the desired molecular sieve crystals have formed, the solid product is separated from the reaction mixture by standard separation techniques such as filtration or centrifugation. The recovered crystals are water-washed and then dried, for several seconds to a few minutes (e.g., from 5 seconds to 10 minutes for flash drying) or several hours (e.g., from 4 to 24 hours for oven drying at 75° C. to 150° C.), to obtain as-synthesized SSZ-123 crystals having at least a portion of the organic cation within its pores. The drying step can be performed at atmospheric pressure or under vacuum.

The as-synthesized molecular sieve may be subjected to thermal treatment, ozone treatment, or other treatment to remove part or all of the structure directing agent used in its synthesis. Removal of the structure directing agent may be carried out by thermal treatment (i.e., calcination) in which the as-synthesized molecular sieve is heated in air or inert gas at a temperature sufficient to remove part or all of the structure directing agent. While sub-atmospheric pressure may be used for the thermal treatment, atmospheric pressure is desired for reasons of convenience. The thermal treatment may be performed at a temperature at least 370° C. for at least a minute and generally not longer than 20 hours (e.g., from 1 to 12 hours). The thermal treatment can be performed at a temperature of up to 925° C. For example, the thermal treatment may be conducted at a temperature of 400° C. to 600° C. in air for approximately 1 to 8 hours.

Any extra-framework metal cations in the molecular sieve can be replaced in accordance with techniques well known in the art (e.g., by ion exchange) with hydrogen, ammonium, or any desired metal cation.

Characterization of the Molecular Sieve

In its as-synthesized and anhydrous form, molecular sieve SSZ-123 can have a chemical composition, in terms of molar ratios, within the ranges set forth in in Table 2:

TABLE 2

|  | Broadest | Secondary |
| --- | --- | --- |
| $SiO_2/Al_2O_3$ | 10 to 35 | 15 to 30 |
| $Q/SiO_2$ | >0 to 0.1 | >0 to 0.1 |
| $M/SiO_2$ | >0 to 0.1 | >0 to 0.1 | wherein Q comprises 1-ethyl-1-[5-(triethylammonio)pentyl]piperidinium cations and M is an alkali or alkaline earth metal.

In its calcined form, molecular sieve SSZ-123 can have a chemical composition comprising the following molar relationship:

$$Al_2O_3:(n)SiO_2$$

wherein n is in a range of from 10 to 35 (e.g., 10 to 33, 10 to 30, 15 to 35, 15 to 33, or 15 to 35).

Powder XRD patterns representative of MFS framework type molecular sieves can be referenced in the "*Collection of Simulated XRD Powder Patterns for Zeolites*" by M. M. J. Treacy and J. B. Higgins (Elsevier, Fifth Revised Edition, 2007).

The powder XRD patterns presented herein were collected by standard techniques. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

INDUSTRIAL APPLICABILITY

Molecular sieve SSZ-123 (where part or all of the structure directing agent is removed) may be used as a sorbent or as a catalyst to catalyze a wide variety of organic compound conversion processes including many of present commercial/industrial importance. Examples of chemical conversion processes which are effectively catalyzed by SSZ-123, by itself or in combination with one or more other catalytically active substances including other crystalline catalysts, include those requiring a catalyst with acid activity. Examples of organic conversion processes which may be catalyzed by SSZ-123 include cracking, hydrocracking, disproportionation, alkylation, oligomerization, and isomerization.

As in the case of many catalysts, it may be desirable to incorporate SSZ-123 with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring, or in the form of gelatinous precipitates or gels, including mixtures of silica and metal oxides. Use of a material in conjunction with SSZ-123 (i.e., combined therewith or present during synthesis of the new material) which is active, tends to change the conversion and/or selectivity of the catalyst in certain organic conversion processes. Inactive materials suitably serve as diluents to control the amount of conversion in a given process so that products can be obtained in an economic and orderly manner without employing other means for controlling the rate of reaction. These materials may be incorporated into naturally occurring clays (e.g., bentonite and kaolin) to improve the crush strength of the catalyst under commercial operating conditions. These materials (i.e., clays, oxides, etc.) function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with SSZ-123 include the montmorillonite and kaolin family, which families include the sub-bentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with SSZ-123 also include inorganic oxides, such as silica, zirconia, titania, magnesia, beryllia, alumina, and mixtures thereof.

In addition to the foregoing materials, SSZ-123 can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of SSZ-123 and inorganic oxide matrix may vary widely, with the SSZ-123 content ranging from 1 to 90 wt. % (e.g., 2 to 80 wt. %) of the composite.

EXAMPLES

The following illustrative examples are intended to be non-limiting.

Example 1

2.45 g of deionized water, 0.37 g of 45% KOH solution, 2.68 g of 17.8% 1-ethyl-1-[5-(triethylammonio)pentyl]piperidinium hydroxide solution, 0.08 g of 50% Reheis F-2000 aluminum hydroxide dried gel and 2.00 g of LUDOX® AS-30 colloidal silica (30 wt. % suspension in water) were mixed together in a Teflon liner. The resulting gel was stirred until it became homogeneous. The liner was then capped and placed within a Parr Steel autoclave reactor. The autoclave was then put in an oven heated at 160° C. for 12 days with tumbling at 43 rpm. The solid products were recovered from the cooled reactor by centrifugation, washed with deionized water and dried at 95° C.

Figure 2:
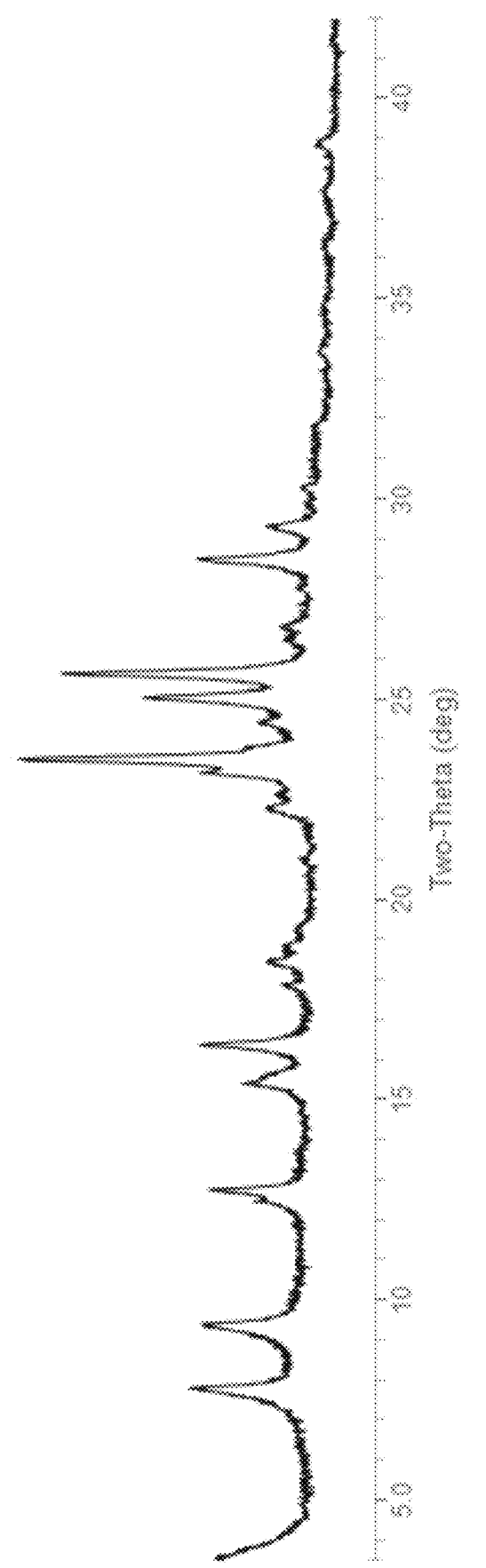
FIG. 2 shows a powder X-ray diffraction (XRD) patterns of the product of Example 1.

The resulting product was analyzed by SEM and powder XRD. A SEM image is shown in FIG. 1 and indicates a uniform field of crystals. The powder XRD pattern of the as-synthesized material is shown in FIG. 2 and is consistent with the material having the MFS framework type structure.

The product had a $SiO_2/Al_2O_3$ molar ratio of 18.8, as determined by Inductively Coupled Plasma—Atomic Emission Spectroscopy (ICP-AES) elemental analysis.

Example 2

1.84 g of deionized water, 0.28 g of a 45% KOH solution, 2.01 g of a 17.8% 1-ethyl-1-[5-(triethylammonio)pentyl] piperidinium hydroxide solution, 0.05 g of Reheis F-2000 aluminum hydroxide dried gel and 1.50 g of LUDOX® AS-30 colloidal silica were mixed together in a Teflon liner. The gel was stirred until it became homogeneous. The liner was then capped and placed within a Parr Steel autoclave reactor. The autoclave was then put in an oven heated at 160° C. for 10 days with tumbling at 43 rpm. The solid products were recovered from the cooled reactor by centrifugation, washed with deionized water and dried at 95° C.

Analysis by powder XRD showed the product to be an MFS framework type molecular sieve.

The product had a $SiO_2/Al_2O_3$ molar ratio of 21.7, as determined by ICP-AES elemental analysis.

Example 3

2.46 g of deionized water, 0.37 g of a 45% KOH solution, 2.68 g of a 17.8% 1-ethyl-1-[5-(triethylammonio)pentyl] piperidinium hydroxide solution, 0.05 g of Reheis F-2000 aluminum hydroxide dried gel and 2.00 g of LUDOX® AS-30 colloidal silica were mixed together in a Teflon liner. The gel was stirred until it became homogeneous. The liner was then capped and placed within a Parr Steel autoclave reactor. The autoclave was then put in an oven heated at 160° C. for 10 days with tumbling at 43 rpm. The solid products were recovered from the cooled reactor by centrifugation, washed with deionized water and dried at 95° C.

Analysis by powder XRD showed the product to be an MFS framework type molecular sieve.

The product had a $SiO_2/Al_2O_3$ molar ratio of 31.2, as determined by ICP-AES elemental analysis.

Example 4

3.20 g of deionized water, 0.37 g of a 45% KOH solution, 1.79 g of a 17.8% 1-ethyl-1-[5-(triethylammonio)pentyl] piperidinium hydroxide solution, 0.04 g of Reheis F-2000 aluminum hydroxide dried gel and 2.00 g of LUDOX® AS-30 colloidal silica were mixed together in a Teflon liner. The gel was stirred until it became homogeneous. The liner was then capped and placed within a Parr Steel autoclave reactor. The autoclave was then put in an oven heated at 160° C. for 10 days with tumbling at 43 rpm. The solid products were recovered from the cooled reactor by centrifugation, washed with deionized water and dried at 95° C.

Analysis by powder XRD showed the product to be a mixture of an MFS-type molecular sieve and a dense phase.

Example 5

2.44 g of deionized water, 0.37 g of a 45% KOH solution, 2.68 g of a 17.8% 1-ethyl-1-[5-(triethylammonio)pentyl]piperidinium hydroxide solution, 0.10 g of Reheis F-2000 aluminum hydroxide dried gel and 2.00 g of LUDOX® AS-30 colloidal silica were mixed together in a Teflon liner. The resulting gel was stirred until it became homogeneous. The liner was then capped and placed within a Parr Steel autoclave reactor. The autoclave was then put in an oven heated at 160° C. for 10 days with tumbling at 43 rpm. The solid products were recovered from the cooled reactor by centrifugation, washed with deionized water and dried at 95° C.

Analysis by powder XRD showed the product to be a mixture of an MFS framework type molecular sieve and an unknown phase.

Example 6

Example 5 was repeated except that 5 wt. % of as-synthesized MFS seed crystals prepared from Example 1 were added to the reaction mixture and the reaction time was reduced to 7 days.

Analysis by powder XRD showed the product to be a pure phase MFS framework type molecular sieve.

The product had a $SiO_2/Al_2O_3$ molar ratio of 16.5, as determined by ICP-AES elemental analysis.

Example 7

The as-synthesized molecular sieve product from Example 1 was calcined inside a muffle furnace under a flow of air at a temperature of about 540° C. for about 5 hours. After cooling, the sample was analyzed by powder XRD. Powder XRD indicated that the material remains stable after calcination to remove the structure directing agent.

Example 8

The calcined material from Example 7 was treated with 10 mL (per g of molecular sieve) of a 1 N ammonium nitrate solution at 95° C. for 2 hours. The solution was cooled, decanted off and the same process repeated. The product ($NH_4$—SSZ-123) after drying was subjected to a micropore volume analysis using $N_2$ as adsorbate and via the BET method. The molecular sieve exhibited a micropore volume of 0.14 $cm^3$/g.

The invention claimed is:

1. A method of synthesizing a molecular sieve of MFS framework type, the method comprising:
   (1) preparing a reaction mixture comprising:
      (a) a source of silicon, wherein the source of silicon is selected from colloidal silica, precipitated silica, fumed silica, alkali metal silicates, tetraalkyl orthosilicates, and any combination thereof;
      (b) a source of aluminum, wherein the source of aluminum is selected from hydrated alumina, aluminum hydroxide, alkali metal aluminates, aluminum alkoxides, water-soluble aluminum salts, and any combination thereof;
      (c) a source of an alkali or alkaline earth metal (M), wherein the alkali or alkaline earth metal comprises potassium;
      (d) a structure directing agent comprising 1-ethyl-1-[5-(triethylammonio)pentyl]piperidinium cations (Q);
      (e) a source of hydroxide ions; and
      (f) water; and
   (2) subjecting the reaction mixture to crystallization conditions to form crystals of the molecular sieve, wherein the crystallization conditions comprise heating the reaction mixture under autogenous pressure at a temperature of from 120° C. to 200° C. for a time of from 1 day to 21 days; wherein the reaction mixture has a composition, in terms of molar ratios, as follows:

| | |
|---|---|
| $SiO_2/Al_2O_3$ | 10 to 35 |
| $M/SiO_2$ | 0.05 to 0.50 |
| $Q/SiO_2$ | 0.01 to 0.30 |
| $OH/SiO_2$ | 0.10 to 0.70 |
| $H_2O/SiO_2$ | 15 to 60. |

2. The method of claim 1, wherein the reaction mixture has a composition, in terms of molar ratios, as follows:

| | |
|---|---|
| $SiO_2/Al_2O_3$ | 15 to 30 |
| $M/SiO_2$ | 0.10 to 0.50 |
| $Q/SiO_2$ | 0.05 to 0.20 |
| $OH/SiO_2$ | 0.40 to 0.60 |
| $H_2O/SiO_2$ | 20 to 40. |

3. The method of claim 1, wherein the structure directing agent comprising 1-ethyl-1-[5-(triethylammonio)pentyl]piperidinium cations is associated with an anion selected from the group consisting of hydroxide, chloride, and bromide.

4. The method of claim 1, wherein in (2), the temperature is in a range of from 140° C. to 180° C.

5. The method of claim 1, wherein in (2), the time is in a range of from 3 days to 14 days.

6. The method of claim 1, wherein in (2), the heating is carried out in an autoclave.

7. The method of claim 1, wherein the reaction mixture further comprises from 0.01 to 10,000 ppm by weight of seeds, wherein the seeds comprise a crystalline molecular sieve having an MFS framework.

8. The method of claim 1, further comprising separating the crystals from the reaction mixture.

9. The method of claim 8, wherein the separating comprises filtration and/or centrifugation.

10. The method of claim 8, further comprising calcining the crystals in air or an inert gas at a temperature in a range of from 400° C. to 600° C.

* * * * *